Jan. 23, 1951   H. V. WILLIAMSON ET AL   2,539,291
APPARATUS AND METHOD FOR VAPORIZING CARBON DIOXIDE
Filed June 8, 1948   3 Sheets-Sheet 2
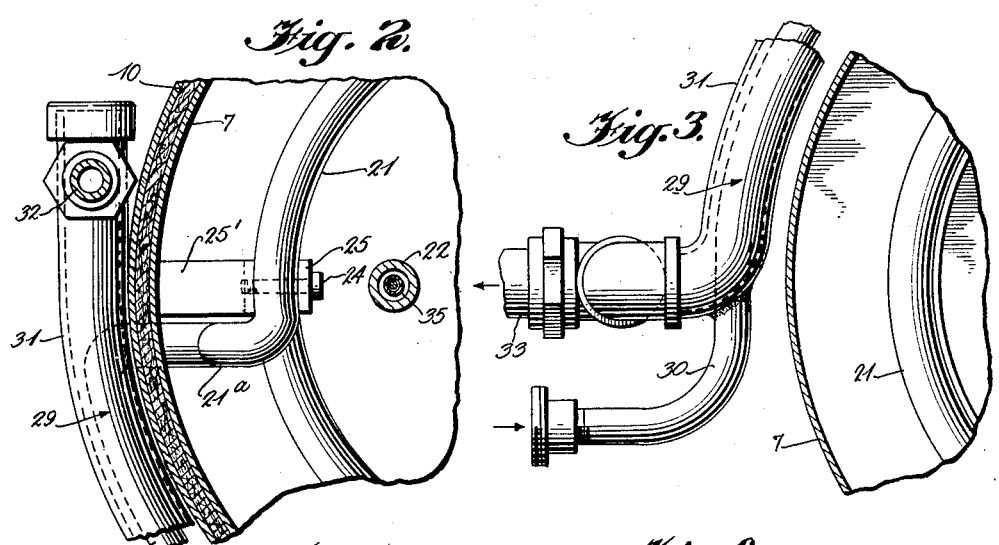
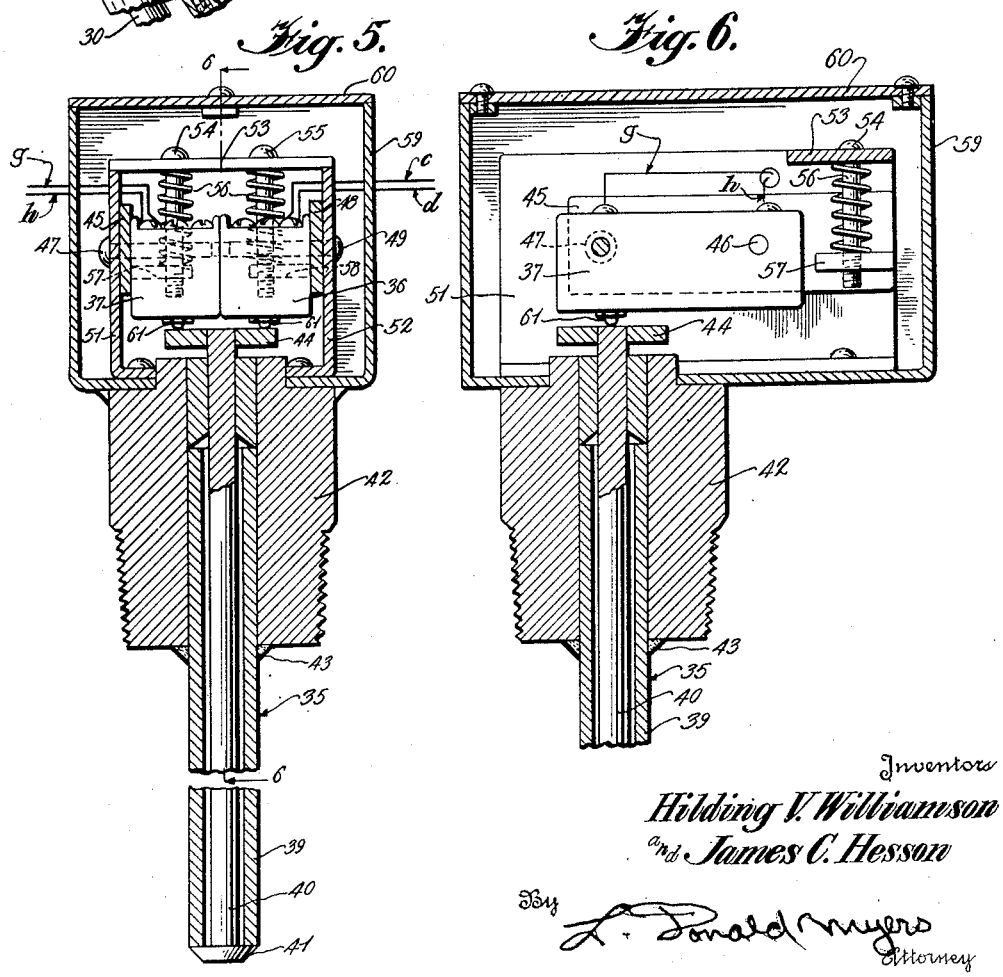
Inventors
Hilding V. Williamson
and James C. Hesson
By L. Donald Myers
Attorney

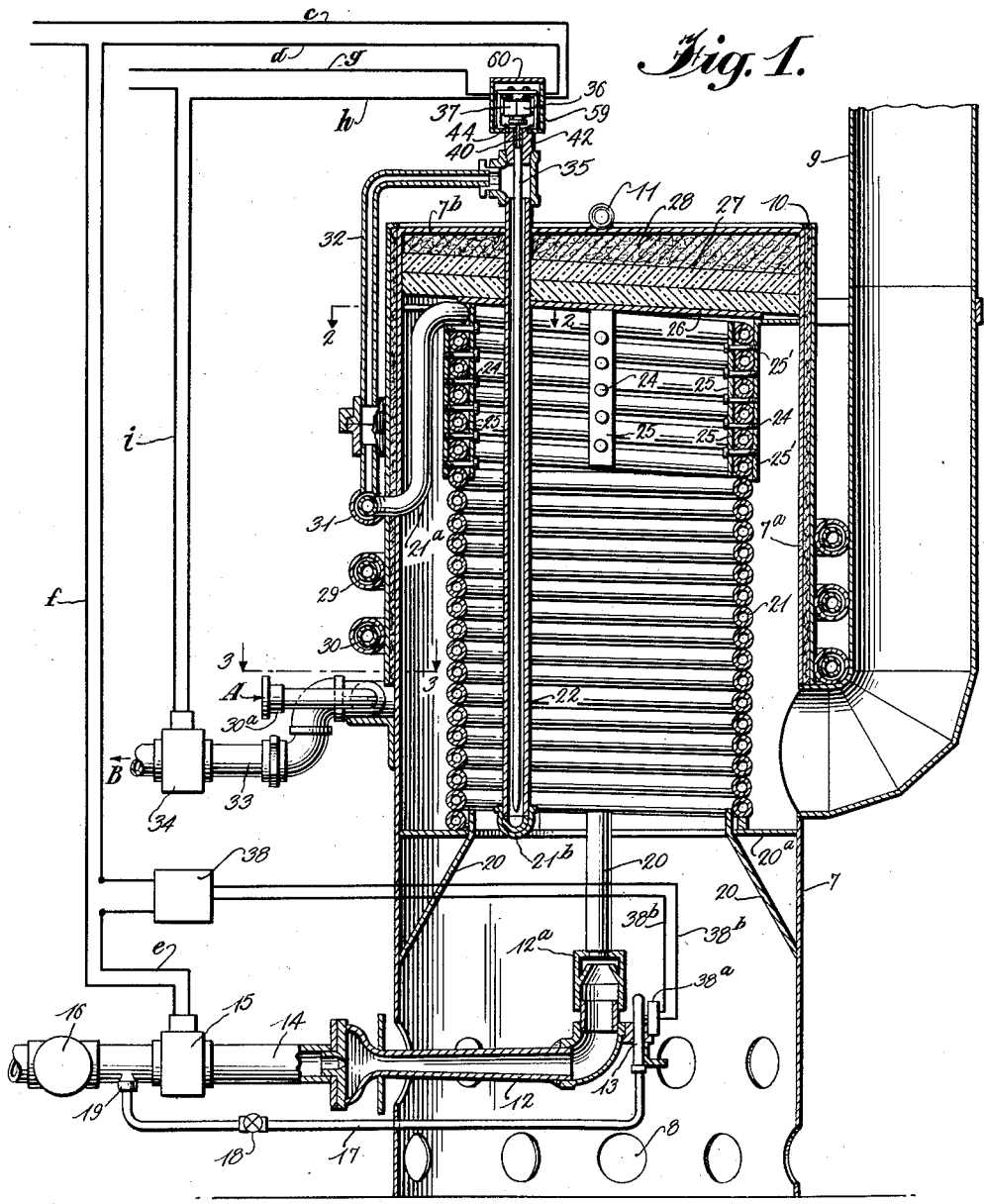

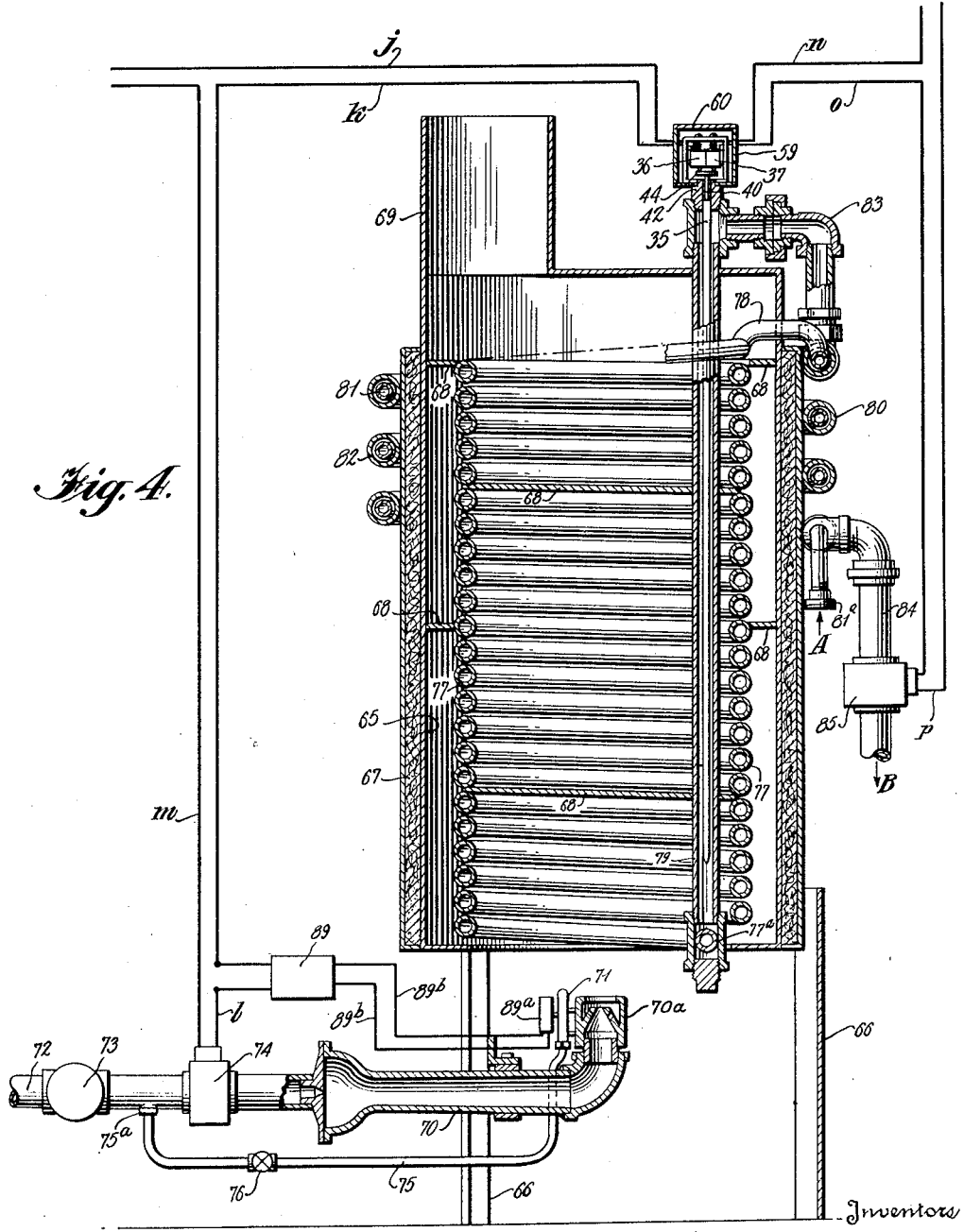

Patented Jan. 23, 1951

2,539,291

UNITED STATES PATENT OFFICE 2,539,291

APPARATUS AND METHOD FOR VAPORIZING CARBON DIOXIDE

Hilding V. Williamson and James C. Hesson, Chicago, Ill., assignors to Cardox Corporation, Chicago, Ill., a corporation of Illinois Application June 8, 1948, Serial No. 31,736

21 Claims. (Cl. 62—1)

This invention relates to a method of and apparatus for the vaporization of carbon dioxide or other liquefiable gases from a liquid phase, and the delivery of the vaporized gas at a relatively constant low temperature to a point of use or consumption.

When a large amount of carbon dioxide vapor is required, such as for inerting storage tanks or vessels containing inflammable vapor, it has been found to be desirable that the temperature of the vapor be kept at a relatively constant low value. These conditions, when present, satisfy two very important requirements. A constant temperature is very important if not absolutely essential to the accurate determination and regulation of the rate of discharge of the carbon dioxide vapor. Further, at low temperatures the density of the discharged vapor is greatest, and the discharge may be directed into an atmosphere of relatively high density with less danger of the vapor escaping through a top opening or hatch.

Another important requirement for carbon dioxide vaporizers is that the liquid carbon dioxide be completely vaporized before discharge. This feature is particularly essential in those cases where the pressure of the vapor may be reduced to below 60 pounds per square inch gauge as slugs or drops of liquid carbon dioxide would flash to solid carbon dioxide which might result in plugging of valves and conduits of the unit. Complete vaporization of the carbon dioxide can be assured by heating the carbon dioxide to a temperature well above its vaporization temperature, but at this temperature the advantage of the greater density at lower temperatures is lost.

Prior types of carbon dioxide vaporizers have made possible the enjoyment of the advantages gained by a low temperature discharge, or the advantage of complete vaporization; but it has not in the past been possible to realize both these advantages simultaneously, nor has it been possible to closely limit the variations in the discharge temperature resulting from the lag inherent in most temperature control devices.

It is then a primary object of this invention to provide a direct draw carbon dioxide vaporizer capable of delivering a large quantity of carbon dioxide vapor at a relatively constant low temperature.

A further object of the invention is the provision of a novel method and apparatus for the complete vaporization of liquefiable gases and the delivery of the vaporized gases at a relatively constant low temperature.

A further object of the invention is to provide a method and apparatus for vaporizing liquid carbon dioxide for delivery at a relatively constant and determinable rate of flow.

A further object of the invention is to provide a method for completely vaporizing liquid carbon dioxide at a temperature well above its vaporization temperature and delivering the carbon dioxide vapor to its point of use at a temperature near its vaporization temperature without recommunication of the vapor with the liquid carbon dioxide.

A still further object of the invention is to provide a carbon dioxide vaporizer having temperature responsive controls for the source of heat and the vapor discharge, adapted to respond in accordance with the temperature of the vapor inside the vaporizing unit to control the application of heat regardless of whether or not vapor is being withdrawn.

Other objects and advantages of the invention will become apparent during the course of the following description.

In the accompanying drawings forming a part of this specification and in which like numerals are employed to designate like parts throughout the same, Figure 1 is a vertical sectional view of a complete vaporizer unit illustrating an embodiment of the invention, Figure 2 is a fragmentary, enlarged sectional view on line 2—2 of Fig. 1, Figure 3 is a fragmentary, enlarged sectional view on line 3—3 of Fig. 1, Figure 4 is a vertical sectional view of a complete vaporizer unit illustrating a modification of the unit illustrated in Fig. 1, Figure 5 is a vertical sectional view of the control switches illustrated in Figs. 1 and 4 on an enlarged scale, and Figure 6 is a sectional view on line 6—6 of Fig. 5.

In the drawings, wherein for the purpose of illustration, are shown the preferred embodiments of this invention, and referring first to Fig. 1, the numeral 7 designates a housing having openings 8 around its lower portion for the admission of air and a stack 9 for the exhaust of combustion gases. The upper portion of the side wall 7a of the housing is surrounded by an encased layer of suitable heat insulating material 10 and the top wall 7b of the housing is provided with a lifting lug 11.

A gas burner 12 is positioned in the lower portion of the housing 7 and is so arranged that the heat therefrom will rise upwardly through the center portion thereof. Attached to the gas burner 12 near the point of issuance of the flame from the burner tip 12a is a pilot burner 13. The gas burner 12 is supplied with fuel through a conduit 14 having an electrically controlled shut-off valve 15 and an automatic pressure regulator 16. The pilot burner 13 receives its supply of fuel through the conduit 17, having a manual shut-off valve 18, and is connected to the conduit 14 at 19.

The housing 7 is provided with a plurality of arms 20 and a ring 20a for supporting a vaporizing coil 21 which has its inlet end portion 21a extending from the upper end of the coil and its outlet 21b at the lower end of the coil. The outlet 21b is connected to a vertical pipe 22 which passes upwardly through the bore of the vaporizing coil 21 and through the top wall of the housing 7. The inlet end portion 21a of the vaporizing coil passes through the side wall 7a of the housing at a point somewhat below the upper end of the vaporizing coil 21.

The several uppermost turns of the vaporizing coil 21 are spaced from each other by the bolts 24 which pass therebetween and through the straps 25 and 25'. The remaining turns of the vaporizing coil 21 form an unbroken surface by being placed in contact with each other. As a result of this arrangement, the hot gases rising from the burner tip 12a must pass upwardly through the central bore of the vaporizing coil 21, through the spaces provided between the uppermost turns of the coil, and then downwardly through the annular space formed between the wall 7a of the housing and the outer face of the vaporizing coil 21 to be finally exhausted from the housing 7 through the stack 9.

A cover plate 26 lies across the top of the vaporizing coil 21 and supports a double layer of fire-brick 27. The space between the fire-brick 27 and the top wall 7b of the housing is filled with a suitable heat insulating material 28.

A heat exchange coil 29 surrounds the housing 7 and its encased heat insulating material 10 near the medial portion of the housing. This heat exchange coil is composed of an inner pipe 30 with an outer pipe 31 concentrically arranged therewith. This arrangement provides for the flow of fluids through both of these pipes without communication therebetween. The inlet end 21a of the vaporizing coil is connected to the upper end of the inner pipe 30 so as to provide communication between the heat exchange coil 29 and the vaporizing coil 21 as illustrated in Fig. 2. The upper end of the vertical pipe 22 is connected to the upper end of the outer pipe 31 of the heat exchange coil 29 by the conduit 32. This arrangement places the outlet 21b of the vaporizing coil 21 in communication with the outer pipe 30 of the heat exchange coil 29. The lower ends of the inner pipe 30 and the outer pipe 31 are separated at the lower end of the heat exchange coil 29, as illustrated in Fig. 3. The lower end 30a of the inner pipe 30 is adapted to be connected to a source of supply of liquid carbon dioxide, not shown. The lower end of the outer pipe 31 is connected to the carbon dioxide vapor discharge conduit 33 that is provided with an electrically controlled shut-off valve 34.

A bi-metal thermostat rod 35 is positioned within the vertical pipe 22 so that expansion and contraction of the rod will operate the microswitches 36 and 37 which in turn open or close the electric circuits which operate the electrically controlled valves 15 and 34. Reference character 38 designates a standard type of safety control switch not shown in detail. The switch is of the type that is manually closed and is held in a closed position by the energization of a solenoid. The solenoid operates in response to current generated by the thermocouple 38a and carried by the wires 38b so that, if for any reason the pilot burner 13 is extinguished, the safety control switch 38 will open to cause the electrically controlled valve 15 to be closed.

The electric circuit connecting the microswitch 36, the safety control switch 38, and the electrically controlled shut-off valve 15 in series across the power supply source consists of the wire c leading from the power source to the terminal on one side of the microswitch 36, the wire d leading from one of the double-throw terminals on the other side of the microswitch 36 to one terminal of the safety control switch 38, the wire e leading from the other terminal of the safety control switch 38 to one terminal of the electrically controlled shut-off valve 15, and the wire f connecting the other terminal of the electrically controlled shut-off valve 15 to the power source.

The electric circuit connecting the microswitch 37 and the electrically controlled shut-off valve 34 in series across the power source consists of the wire g connecting one terminal of the microswitch 37 to the power source, the wire h connecting a double-throw terminal on the opposite side of the microswitch 37 to one terminal of the electrically controlled shut-off valve 34, and the wire i connecting the other terminal of the valve 34 to the power source.

Referring now to Figs. 5 and 6 for a detailed description of the arrangement and operation of the microswitches 36 and 37, the bi-metal rod 35 is composed of an outer tubular member 39 and an inner solid member 40. These two members are connected at their lower extremities by a welded joint 41. The outer member 39 is welded to the lower surface of the plug 42 at 43, and the upper end portion of the inner member 40 passes through the plug 42 and projects beyond the upper surface thereof for vertical movement in response to changes in the length of the outer member 39. The projecting portion of the inner member 40 is provided with a contact plate 44 which is rigidly connected thereto. The microswitches 36 and 37 are of standard construction and are of the single-pole, double-throw, snap-action type disclosed in the P. K. McCall patent, No. 1,960,020, issued May 22, 1934. The microswitch 37 is rigidly mounted on the plate 45 by the pins 46 and 47, and the microswitch 36 is similarly mounted on the plate 48 by two pins 49, only one of which is illustrated. The plate 45 and its attached microswitch 37 are in turn pivotally mounted on the supporting frame 51 by the pin 47, and the plate 48 and its attached microswitch 36 are pivotally mounted on the supporting frame 52 by the pin 49. A bracket 53 is connected to the upper portions of the two supporting frames 51 and 52 and supports the adjusting screws 54 and 55 which pass through the springs 56 to be threadedly connected to the lugs 57 and 58 which are mounted on the plates 45 and 48, respectively. The entire dual microswitch assembly is enclosed by a housing 59 having a detachable cover 60.

In operation, the outer member 39 of the bi-metal rod 35 responds to temperature changes by expanding and contracting. These expansions and contractions cause the inner member 40 to move the contact plate 44 up or down a corresponding distance. The depressible pins 61 of the microswitches 36 and 37 are located at points spaced only short distances from the pivot pins 47 and 49 and respond to the movements of the contact plate 44 to open or close the circuits through the microswitches 36 and 37, as the case may be.

Only one of the double-throw terminals of each microswitch 36 and 37 is connected in the electric circuit thereof, so that when the movable element of the switch is not engaging the connected terminal, the circuit is open. With this arrangement, it is possible to connect the wire $h$ to one of the double-throw terminals of the microswitch 37 and the wire $d$ to the opposite double-throw terminal of the microswitch 36 so that an upward movement of the contact plate 44, depressing the pins 61, will cause the circuit through the microswitch 37 to open and the circuit through the microswitch 36 to close. Thus, movement of the contact plate 44 in an upward direction serves to close the electrically controlled shut-off valve 34 and to open the electrically controlled shut-off valve 15. Conversely, a downward movement of the contact plate 44 serves to reverse the above procedure to open the valve 34 and to close the valve 15.

The points at which the microswitches 36 and 37 will be caused to function to open or close their respective circuits may be individually adjusted by turning the adjusting screws 54 and 55. This adjustment causes the plates 45 and 48 to pivot about the pins 47 and 49 respectively, and thereby changes the positions of depressible pins 61 relative to the positions of the contact plate 44. The setting and adjustment of the switches 36 and 37 will be further discussed in a later paragraph.

Referring now to Fig. 4 wherein is illustrated a modification of the embodiment of the invention illustrated in Fig. 1, the numeral 65 designates a housing mounted on the supporting legs 66 and surrounded by an encased layer of suitable heat insulating material 67. The baffle plates 68 are so arranged within the housing 65 as to provide a tortuous path for the hot combustion gases rising therethrough to be exhausted through the stack 69.

The gas burner 70, having a burner tip 70a, is positioned beneath the central portion of the open bottom of the housing 65, and is supplied with fuel through the conduit 72 having an automatic pressure regulator 73 and an electrically controlled shut-off valve 74. The pilot burner 71 for the burner 70 is supplied with fuel through the conduit 75 having a manual shut-off valve 76 and connected to the conduit 72 at 75a.

A vaporizing coil 77 is suitably mounted in the housing 65 and is so arranged that the baffle plates 68 will cause the heated gases rising from the burner 70 to pass between its spaced turns. The inlet end 78 of the vaporizing coil passes through the side wall of the housing 65 at a point near its upper end and the outlet end 77a is connected to a vertical pipe 79 which rises through the bore of the vaporizing coil 77 and through the top wall of the housing 65.

A heat exchange coil 80, surrounding the upper portion of the housing 65, is composed of an inner pipe 81 and an outer pipe 82 concentrically arranged one within the other. The inlet end 78 of the vaporizing coil is connected to the upper end of the inner pipe 81, and the pipe 83 connects the upper end of the vertical pipe 79 to the upper end of the outer pipe 82. The inner pipe 81 and the outer pipe 82 are separated at the lower end of the heat exchange coil 80 and the lower end 81a of the inner pipe 81 is adapted to be connected to a source of supply of liquid carbon dioxide, not shown. The lower end of the outer pipe 82 is connected to the carbon dioxide vapor discharge conduit 84 which is provided with an electrically controlled shut-off valve 85.

The microswitches 36 and 37 used in conjunction with the device illustrated in Fig. 4 are identical to those illustrated in Figs. 1, 5 and 6, and are similarly arranged. For this reason, the reference characters designating them and the immediately associated parts will be consistent with those of the above mentioned figures.

The electric circuit connecting the microswitch 36, the safety control switch 89, and the electrically controlled shut-off valve 74 in series across the power supply source consists of the wire $j$ leading from the power source to the terminal on one side of the microswitch 36, the wire $k$ leading from one of the terminals on the other side of the microswitch 36 to one side of the safety control switch 89, the wire $l$ leading from the other side of the safety control switch 89 to one terminal of the electrically controlled shut-off valve 74, and the wire $m$ connecting the other terminal of the electrically controlled shut-off valve 74 to the power source.

The electric circuit connecting the microswitch 37 and the electrically controlled shut-off valve 85 in series across the power supply source consists of the wire $n$ connecting one terminal of the microswitch 37 to the power source, the wire $o$ connecting one of the double-throw terminals on the opposite side of the microswitch 37 to one terminal of the electrically controlled shut-off valve 85, and the wire $p$ connecting the other terminal of the valve 85 to the power source.

A bi-metal thermostat rod 35 is positioned within the vertical pipe 79 for operating the microswitches 36 and 37 to open or close the electric circuits which in turn operate the electrically controlled shut-off valves 74 and 85. Reference character 89 designates a control switch of a standard type which is not shown in detail. The switch is located in the circuit for operating the valve 74 which controls the supply of fuel to the gas burner 70, and is of the type that is manually closed and is held in a closed position by the energization of a solenoid. The solenoid is operated in response to current generated by the thermocouple 89a and carried by the wires 89b so that, if for any reason the pilot burner 71 is extinguished, the safety control switch will open causing the electrically controlled valve 74 to be closed.

The arrangement and operation of the microswitches 36 and 37 illustrated in Fig. 4, being identical to that illustrated in Figs. 1, 5 and 6, will not be redescribed at this point.

Referring once again to Fig. 1 for a description of the operation of the vaporizer therein illustrated: the liquid carbon dioxide from its source of supply, not shown, enters the heat exchange coil 29 as indicated by the arrow at A. From this point of entrance, the liquid carbon dioxide passes through the inner pipe 30 of the heat exchange coil 29 and to the inlet end portion 21a of the vaporizing coil 21. The carbon dioxide then passes through the vaporizing coil 21 where it is completely vaporized by the heat supplied by the burner 12. The carbon dioxide vapor thus formed then passes through the outlet 21b of the vaporizing coil and enters the vertical pipe 22 where it passes in contact with the bi-metal thermostat rod 35 to enter the conduit 32. This conduit directs the heated vapor into the outer pipe 31 of the heat exchange coil 29 where it is in heat exchange relationship with the inner pipe 30. The heated vapor is thus cooled during its passage through the outer pipe 31 by its contact with the inner pipe 30, which contains the liquid carbon dioxide, and leaves the heat exchange coil 29 to enter the carbon dioxide vapor discharge conduit 33.

The contact of the carbon dioxide vapor with the bi-metal thermostat rod 35 in the pipe 22 causes the rod to respond to temperature changes of the carbon dioxide vapor leaving the vaporizing coil 21 through the pipe 22. When the temperature of the vapor drops, the bi-metal rod 35 contracts causing the microswitch 36 to function to close its electric circuit and open the valve 15 in the fuel supply conduit 14 whereby the gas burner 12 is ignited and the heat therefrom causes the temperature of the carbon dioxide vapor passing through the vaporizing coil 21 and the pipe 22 to rise. As the vapor temperature rises the bi-metal rod 35 expands causing the microswitch 36 to function to open its electric circuit which closes the electrically controlled shut-off valve 15 whereby the supply of fuel to the burner 12 is cut off. The pilot burner 13 serves to automatically ignite the gas burner 12 when it is again supplied with fuel. The safety control switch 38 functions to prevent opening of the electric control valve 15 if for any reason the pilot burner 13 is extinguished whereby the fuel supplied to the burner 12 could not be ignited and would escape creating the possibility of an explosion.

The microswitch 37 responds to the action of the bi-metal rod 35 in a manner similar to that of the microswitch 36. However, the temperature of the carbon dioxide vapor at which the microswitches 36 and 37 react may be varied individually. The adjustment of the microswitch 37 is such that the electric circuit through the same and the electrically controlled valve 34 is actuated only when contraction of the bi-metal rod 35 is beyond the normal operating range and the temperature of the carbon dioxide vapor is below the desired minimum temperature. In this case, the electrically controlled valve 34 closes to prevent passage of the carbon dioxide vapor from the vaporizer. As a result of this action it is possible to arrange the adjustment of the microswitch 37 so that it is impossible for incompletely vaporized carbon dioxide to escape from the vaporizing device.

The operation of the modification illustrated in Fig. 4 is similar to that of the device illustrated in Fig. 1 and will not be again described.

Adjustment of the microswitches 36 and 37 as to the temperatures at which they will function will of course vary with the different requirements encountered. The temperature and pressure conditions of the liquid carbon dioxide in the source of supply employed and the temperature and pressure requirement for the discharged carbon dioxide vapor will vary from time to time. With these variables in mind and with no intent to limit the scope of the invention, as claimed, a typical set of operating conditions will be described in the following example.

Having a supply of liquid carbon dioxide, not shown, stored at a temperature of 0° F. and a pressure of 305 pounds per square inch, absolute, the microswitch 36 may be set to cause the electrically controlled shut-off valve 15 to open when the temperature of the carbon dioxide vapor in the pipe 22 drops below 210° F., and to close when the temperature of the vapor in the pipe 22 exceeds 210° F. The microswitch 37 will be set to function to cause the electrically controlled valve 34 to close when the temperature of the carbon dioxide vapor in the pipe 22 drops below 70° F. It will be noted that under normal operating conditions, the valve 34 will remain open at all times.

The liquid carbon dioxide from the source of supply, not shown, enters the vaporizer through the heat exchange coil 29 at A, and in passing therethrough and into the vaporizing coil 21 suffers a small pressure drop due to the pipe friction. As the carbon dioxide then continues through the vaporizing coil 21 the pressure continues to drop due to the pipe friction and the carbon dioxide absorbs heat supplied by the hot combustion gases from the burner 12 until it is completely vaporized. This complete vaporization will be accomplished at some point below a temperature of 87.8° F. which is the critical temperature for carbon dioxide. After the complete vaporization of the carbon dioxide, the vapor continues to absorb heat until it reaches a temperature of 210° F., the temperature corresponding to the setting of the microswitch 36, at which time the shut-off valve 15 will close to prevent a further increase in the temperature of the vapor. The heated carbon dioxide vapor passes from the vaporizing coil 21 through the vertical pipe 22 and the conduit 32 into the heat exchange coil 29. At this point the temperature of the carbon dioxide vapor will be 210° F. and it will be at a pressure of approximately 205 pounds per square inch, absolute.

Due to the fact that the heat retaining capacity of the carbon dioxide vapor is very low, the vapor during its passage through the heat exchange coil 29 will drop in temperature to approximately 30° F. and its pressure upon leaving the heat exchange coil 29 will be approximately 185 pounds per square inch, absolute. Due to the large temperature drop in the carbon dioxide vapor as it passes through the heat exchange coil 29, and to the fact that the carbon dioxide vapor has a low heat retaining capacity, any differences in the carbon dioxide temperature as it leaves the vaporizing coil 21 will be reduced to an insignificant amount before the vapor is discharged from the heat exchange coil 29 into the conduit 33. The pressure drop of the carbon dioxide vapor through conduit 33 to the point of delivery may be varied according to the requirements of the use to which the carbon dioxide vapor is to be put.

It is to be understood that the forms of this invention, herewith shown and described, are to be taken as preferred examples of the same, and that various changes in the shape, size and arrangement of parts may be resorted to, without departing from the spirit of the invention, or the scope of the subjoined claims.

Having thus described our invention, we claim:

1. Apparatus for vaporizing liquid carbon dioxide comprising, a heat exchanger in communication with a liquid carbon dioxide supply source, a coil adapted to receive liquid carbon dioxide from said heat exchanger, automatically controlled means for supplying heat to said coil to vaporize said liquid carbon dioxide, means for passing the vaporized carbon dioxide from said coil through said heat exchanger, and automatic valve means responsive to changes in the temperature of the carbon dioxide vapor passing from said coil for controlling the passage of carbon dioxide vapor from said heat exchanger.

2. Apparatus for vaporizing liquid carbon dioxide comprising, a heat exchanger in communication with a liquid carbon dioxide supply source, a coil adapted to receive liquid carbon dioxide from said heat exchanger, automatically controlled means for supplying heat to said coil to vaporize the liquid carbon dioxide therein and elevate the temperature of the carbon dioxide vapor to a given point considerably above its vaporization temperature, means for passing the heated carbon dioxide vapor from said coil through said heat exchanger to lower the temperature of said vapor, and an automatic valve responsive to a reduction in the temperature of the carbon dioxide vapor passing from said coil to a point below said given point for preventing the passage of carbon dioxide vapor from said heat exchanger.

3. Apparatus for vaporizing liquid carbon dioxide comprising, a heat exchange device adapted to receive liquid carbon dioxide from a storage receptacle, a heating coil having an inlet and an outlet and adapted to receive carbon dioxide vapor and liquid from said heat exchange device, automatically controlled means responsive to the temperature of the carbon dioxide at the outlet of said coil for supplying only sufficient heat to said coil to completely vaporize the liquid carbon dioxide and elevate the temperature of the carbon dioxide vapor to a given point above its vaporization temperature, and discharge means for withdrawing the heated vapor from said coil through said heat exchange device to cool the vapor and supply heat to the associated liquid carbon dioxide to partially vaporize the same.

4. Apparatus for vaporizing liquid carbon dioxide comprising, an indirect heat exchange device adapted to receive liquid carbon dioxide from a storage receptacle, a heating coil connected to said heat exchange device to receive the carbon dioxide vapor and liquid passing therethrough, means for supplying heat to said heating coil to completely vaporize the liquid carbon dioxide and elevate the temperature of the carbon dioxide vapor to a point above its critical temperature, means for automatically regulating said heat supplying means, and discharge means for withdrawing the heated vapor from said coil through said heat exchange device to cool the vapor and supply heat to the associated liquid carbon dioxide to partially vaporize the same.

5. Apparatus for vaporizing liquid carbon dioxide comprising, an indirect heat exchange device adapted to receive liquid carbon dioxide from a supply container, a heating coil connected to said heat exchange device to receive the carbon dioxide vapor and liquid passing therethrough, means for supplying heat to said heating coil to vaporize the liquid carbon dioxide, temperature responsive control means for said heat supplying means, discharge means for withdrawing the vaporized carbon dioxide from said coil through said heat exchange device, and automatic valve means responsive to the temperature of the carbon dioxide passing from said coil for controlling the discharge of carbon dioxide vapor from said discharge means.

6. Apparatus for vaporizing liquid carbon dioxide comprising, an indirect heat exchange device, a heating coil adapted to receive liquid carbon dioxide from a storage receptacle through said heat exchange device, means for supplying heat to said heating coil to vaporize said liquid carbon dioxide and raise the temperature of the carbon dioxide vapor to a point above its critical temperature, temperature responsive means for controlling said heat supplying means to maintain a relatively constant vapor temperature in said coil, and discharge means for withdrawing the carbon dioxide vapor from said coil through said heat exchange device to lower the temperature of said vapor and decrease the slight temperature differentials due to fluctuation in the temperature responsive means.

7. A device of the type described comprising, a cylindrical heating chamber, a base for mounting said chamber in an axially vertical position, a heating coil positioned coaxially within said chamber having an inlet at the upper end portion and an outlet at the lower end portion of said chamber, means for supplying heat to the lower end portion of said chamber, a concentric tube heat exchange coil closely surrounding said chamber, means connecting the inlet of said heating coil to one of the concentric tubes at the upper end portion of said heat exchange coil, and means connecting the outlet of said heating coil to the other concentric tube at the upper end portion of said heat exchange coil, the said tubes at the lower end portion of said heat exchange coil being separated to form an inlet and outlet for the interconnected heating and heat exchange coils.

8. A device of the type described comprising, a cylindrical heating chamber, a base for mounting said chamber in an axially vertical position, a heating coil positioned coaxially within said chamber having an inlet at the upper end portion and an outlet at the lower end portion of said chamber, means for supplying heat to the lower end portion of said chamber, a concentric tube heat exchange coil closely surrounding said chamber, means connecting the inlet of said heating coil to the inner concentric tube at the upper end portion of said heat exchange coil, means connecting the outlet of said heating coil to the outer concentric tube at the upper end portion of said heat exchange coil through a vertical tube within said chamber, the said tubes at the lower end portion of said heat exchange coil being separated to form an inlet and outlet for the interconnected heating and heat exchange coils, valve means for opening and closing said inlet, and valve means for opening and closing said outlet.

9. A device of the type described comprising, a cylindrical heating chamber, a base for mounting said chamber in an axially vertical position, a heating coil positioned coaxially within said chamber having an inlet at the upper end portion and an outlet at the lower end portion of said chamber, means for supplying heat to the lower end portion of said chamber, a concentric tube heat exchange coil closely surrounding said chamber, means connecting the inlet of said heating coil to the inner concentric tube at the upper end portion of said heat exchange coil, means connecting the outlet of said heating coil to the outer concentric tube at the upper end portion of said heat exchange coil through a vertical tube within said chamber, the said tubes at the lower end portion of said heat exchange coil being separated to form an inlet and outlet for the interconnected heating and heat exchange coils, valve means for opening and closing said inlet, valve means for opening and closing said outlet, and automatic means for controlling said outlet valve means and said heat supplying means.

10. A device of the type described comprising, a cylindrical heating chamber, a base for mounting said chamber in an axially vertical position, a heating coil positioned coaxially within said chamber having an inlet at the upper end portion and an outlet at the lower end portion of said chamber, means for supplying heat to the lower end portion of said chamber, a concentric tube heat exchange coil closely surrounding said chamber, means connecting the inlet of said heating coil to the inner concentric tube at the upper end portion of said heat exchange coil, means connecting the outlet of said heating coil to the outer concentric tube at the upper end portion of said heat exchange coil through a vertical tube within said chamber, the said tubes at the lower end portion of said heat exchange coil being separated to form an inlet and outlet for the interconnected heating and heat exchange coils, valve means for opening and closing said inlet, valve means for opening and closing said outlet, and temperature responsive automatic means associated with said vertical tube to control said outlet valve means and said heat supplying means.

11. A device of the type described comprising, a cylindrical heating chamber, a base for mounting said chamber in an axially vertical position, a heating coil positioned coaxially within said chamber having an inlet at the upper end portion and an outlet at the lower end portion of said chamber, means for supplying heat to the lower end portion of said chamber, a concentric tube heat exchange coil closely surrounding said chamber, means connecting the inlet of said heating coil to the inner concentric tube at the upper end portion of said heat exchange coil, means connecting the outlet of said heating coil to the outer concentric tube at the upper end portion of said heat exchange coil through a vertical tube within said chamber, the said tubes at the lower end portion of said heat exchange coil being separated to form an inlet and outlet for the interconnected heating and heat exchange coils, valve means for opening and closing said inlet, valve means for opening and closing said outlet, and a bi-metal thermostat within said vertical tube adapted to automatically operate said outlet valve means and control said heat supply means.

12. A method of vaporizing liquid carbon dioxide comprising, withdrawing liquid carbon dioxide from a source of supply at approximately 0° F. and its corresponding vapor pressure, heating the withdrawn carbon dioxide to a temperature above its critical temperature to completely vaporize the same and to raise the temperature of the carbon dioxide vapor, passing the heated carbon dioxide vapor in indirect heat exchange relationship with the withdrawn liquid carbon dioxide to partially vaporize the same and to lower the temperature of the carbon dioxide vapor to a point below that of the atmosphere into which it is to be discharged, and delivering the cooled carbon dioxide to its intended point of discharge.

13. A method of vaporizing liquid carbon dioxide comprising, withdrawing liquid carbon dioxide from a source of supply, heating the withdrawn liquid carbon dioxide to partially vaporize the same, heating the resulting carbon dioxide vapor and liquid to a temperature above the critical temperature thereof to completely vaporize said liquid and to elevate the temperature of said vapor, controlling the heat applied to said carbon dioxide vapor and liquid in response to the temperature of the heated vapor, passing said seated vapor in indirect heat exchange relationship with said withdrawn liquid to lower the temperature of said vapor to approximately 30° F. and to heat said withdrawn liquid to bring about the aforementioned partial vaporization of the same, and delivering the cooled carbon dioxide vapor to its intended place of use.

14. A method of vaporizing liquid carbon dioxide comprising, withdrawing liquid carbon dioxide from a source of supply, heating the withdrawn carbon dioxide to vaporize the same and raise the temperature of the resulting vapor to a predetermined value substantially above its critical temperature, stopping the application of heat to the carbon dioxide when the vapor temperature exceeds said predetermined value, resuming the application of heat to the carbon dioxide when the vapor temperature falls below said predetermined value, passing the heated carbon dioxide vapor in indirect heat exchange relationship with said withdrawn liquid to lower the temperature of said vapor to approximately 30° F. and partially vaporize said withdrawn liquid, and delivering the cooled carbon dioxide vapor to its intended place of use.

15. A method of vaporizing liquid carbon dioxide comprising, withdrawing liquid carbon dioxide from a source of supply, heating the withdrawn liquid carbon dioxide to completely vaporize the same and to raise the temperature of the resulting vapor to approximately 290° F., controlling the heat applied to said withdrawn carbon dioxide in response to changes in the temperature of said vapor, passing said heated vapor in indirect heat exchange relationship with said withdrawn liquid to lower the temperature of said vapor to approximately 30° F., delivering the cooled carbon dioxide vapor to its intended place of use, and stopping the delivery of said cooled carbon dioxide vapor when the temperature of said heated vapor falls below its critical temperature.

16. A method of vaporizing liquid carbon dioxide comprising, delivering liquid carbon dioxide to a confined flow path, heating the carbon dioxide flowing through said path to completely vaporize the same and to superheat the resultant vapor to a temperature sufficiently above its vaporization temperature to prevent reliquefying of any of said vapor during the following heat exchanging step, varying the application of heat to said flowing carbon dioxide in accordance with variations of the temperature of said superheated vapor before the following heat exchanging step, passing the superheated carbon dioxide vapor in indirect heat exchange relationship with the liquid carbon dioxide being delivered to lower the temperature of the vapor, and discharging the cooled carbon dioxide vapor to a point of use.

17. A method of vaporizing liquid carbon dioxide comprising, delivering liquid carbon dioxide to a confined flow path, heating the carbon dioxide flowing through said path to completely vaporize the same and to superheat the resultant vapor to a temperature sufficiently above its vaporization temperature to prevent reliquefying of any of said vapor during the following heat exchanging step, passing the superheated carbon dioxide vapor in indirect heat exchange relationship with the liquid carbon dioxide being delivered to lower the temperature of the vapor, and discharging the cooled carbon dioxide vapor to a point of use only when the temperature of the superheated vapor exceeds a given value.

18. A method of vaporizing liquid carbon dioxide comprising, delivering liquid carbon dioxide to a confined flow path, heating the carbon dioxide flowing through said path to completely vaporize the same and to superheat the resultant vapor to a temperature sufficiently above its vaporization temperature to prevent reliquefying of any of said vapor during the following heat exchanging step, varying the application of heat to said flowing carbon dioxide in accordance with variations of the temperature of said superheated vapor before the following heat exchanging step, passing the superheated carbon dioxide vapor in indirect heat exchange relationship with the liquid carbon dioxide being delivered to lower the temperature of the vapor, and discharging the cooled carbon dioxide vapor to a point of use for so long as the temperature of the superheated vapor remains above a given value.

19. A method of vaporizing liquid carbon dioxide comprising, delivering liquid carbon dioxide to a confined flow path, heating the carbon dioxide flowing through said path to completely vaporize the same and to superheat the resultant vapor to a temperature sufficiently above its vaporization temperature to prevent reliquefying of any of the vapor during the following heat exchanging step, varying the application of heat to said flowing carbon dioxide in accordance with variations of the temperature of said superheated vapor before the following heat exchanging step, passing the superheated carbon dioxide vapor in indirect heat exchange relationship with the liquid carbon dioxide being delivered to lower the temperature of the vapor and to apply the heat thus extracted from the vapor to the liquid being delivered, and discharging the cooled carbon dioxide vapor at a substantially uniform low temperature to a point of use.

20. Apparatus for vaporizing liquid carbon dioxide comprising, a heat exchanger adapted to receive liquid carbon dioxide from a supply source, heating means in communication with said heat exchanger for receiving liquid carbon dioxide from the heat exchanger, means for supplying heat to said heating means, automatic means responsive to the temperature of the carbon dioxide at the discharge of the heating means for controlling the amount of heat supplied to said heating means to completely vaporize the liquid carbon dioxide and elevate the temperature of the resultant vapor to a point above its vaporization temperature, and means for passing the heated carbon dioxide vapor from said heating means through said heat exchanger to lower the temperature of said vapor and partially vaporize the associated liquid carbon dioxide.

21. Apparatus for vaporizing liquid carbon dioxide comprising, a heat exchanger adapted to receive liquid carbon dioxide from a supply source, heating means in communication with said heat exchanger for receiving liquid carbon dioxide from the heat exchanger, means for applying heat to said heating means, automatic means responsive to the temperature of the carbon dioxide at the discharge of the heating means for controlling the amount of heat supplied to said heating means to effect complete vaporization of the liquid carbon dioxide therein, means for passing the vaporized carbon dioxide from said heating means through said heat exchanger, and automatically acting means for effecting discharge of carbon dioxide vapor from said heat exchanger only when the temperature of the carbon dioxide at the discharge of the heating means exceeds a given value.

HILDING V. WILLIAMSON.
JAMES C. HESSON.

REFERENCES CITED

The following references are of record in the file of this patent:

UNITED STATES PATENTS

| Number | Name | Date |
|---|---|---|
| 1,859,442 | Henderson | May 24, 1932 |
| 1,905,971 | Davisson et al. | Apr. 25, 1933 |
| 2,034,693 | Datin | Mar. 24, 1936 |
| 2,062,827 | Ruppricht | Dec. 1, 1936 |
| 2,273,257 | Gardner | Feb. 17, 1942 |
| 2,343,727 | Zenner | Mar. 7, 1944 |
| 2,352,775 | Dittmer | July 4, 1944 |
| 2,361,252 | Welch | Oct. 24, 1944 |